(12) United States Patent
Kanungo et al.

(10) Patent No.: US 8,984,398 B2
(45) Date of Patent: Mar. 17, 2015

(54) GENERATION OF SEARCH RESULT ABSTRACTS

(75) Inventors: Tapas Kanungo, San Jose, CA (US);
Jan Pedersen, Los Altos, CA (US);
Tamas Sarlos, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 773 days.

(21) Appl. No.: 12/200,380

(22) Filed: Aug. 28, 2008

(65) Prior Publication Data

US 2010/0057710 A1   Mar. 4, 2010

(51) Int. Cl.
*G06F 17/30* (2006.01)

(52) U.S. Cl.
CPC ................................ *G06F 17/30719* (2013.01)
USPC .......................................... 715/254; 707/748

(58) Field of Classification Search
None
See application file for complete search history.

(56) References Cited

U.S. PATENT DOCUMENTS

| | | | | |
|---|---|---|---|---|
| 5,384,703 A | * | 1/1995 | Withgott et al. | 715/236 |
| 5,479,563 A | * | 12/1995 | Yamaguchi | 704/232 |
| 5,638,543 A | * | 6/1997 | Pedersen et al. | 704/1 |
| 5,708,825 A | * | 1/1998 | Sotomayor | 715/205 |
| 5,715,453 A | | 2/1998 | Stewart | |
| 5,819,260 A | * | 10/1998 | Lu et al. | 707/700 |
| 5,913,215 A | | 6/1999 | Rubinstein et al. | |
| 5,918,240 A | * | 6/1999 | Kupiec et al. | 715/243 |
| 5,924,108 A | * | 7/1999 | Fein et al. | 715/267 |
| 5,960,383 A | * | 9/1999 | Fleischer | 704/9 |
| 6,108,619 A | * | 8/2000 | Carter et al. | 704/9 |
| 6,167,368 A | * | 12/2000 | Wacholder | 704/9 |
| 6,205,456 B1 | * | 3/2001 | Nakao | 715/201 |
| 6,334,132 B1 | | 12/2001 | Weeks | |
| 6,349,316 B2 | | 2/2002 | Fein et al. | |
| 6,581,057 B1 | * | 6/2003 | Witbrock et al. | 1/1 |
| 6,742,163 B1 | * | 5/2004 | Ono et al. | 715/236 |
| 6,766,287 B1 | | 7/2004 | Kupiec et al. | |
| 6,904,564 B1 | | 6/2005 | Harris et al. | |
| 6,947,930 B2 | | 9/2005 | Anick et al. | |
| 6,985,864 B2 | * | 1/2006 | Nagao | 704/260 |
| 7,191,131 B1 | * | 3/2007 | Nagao | 704/258 |
| 7,197,451 B1 | * | 3/2007 | Carter et al. | 704/10 |
| 7,356,530 B2 | | 4/2008 | Kim et al. | |
| 7,366,711 B1 | * | 4/2008 | McKeown et al. | 1/1 |
| 7,447,626 B2 | * | 11/2008 | Chaney et al. | 704/9 |
| 7,792,667 B2 | * | 9/2010 | Chaney et al. | 704/9 |
| 2001/0016809 A1 | * | 8/2001 | Ishikawa et al. | 704/10 |
| 2001/0021938 A1 | * | 9/2001 | Fein et al. | 707/531 |
| 2002/0049793 A1 | * | 4/2002 | Okumura et al. | 707/526 |

(Continued)

FOREIGN PATENT DOCUMENTS

| | | | |
|---|---|---|---|
| WO | WO 0062194 | * | 10/2000 |
| WO | WO 0198941 A1 | * | 12/2001 |

(Continued)

OTHER PUBLICATIONS

Extracting Sentence Segments for Text Summarization: A Machine Learning Approach, Chuang et al, ACM 2000.*

(Continued)

*Primary Examiner* — Augustine K Obisesan
(74) *Attorney, Agent, or Firm* — Berkeley Law & Technology Group, LLP (57) ABSTRACT

The subject matter disclosed herein relates to generating an abstract of an electronic document based at least in part on a utility metric associated with a group phrases as well as on a ranked order of sentences.

19 Claims, 5 Drawing Sheets

(56) References Cited

U.S. PATENT DOCUMENTS

| | | | |
|---|---|---|---|
| 2002/0052901 A1* | 5/2002 | Guo et al. | 707/531 |
| 2002/0078090 A1* | 6/2002 | Hwang et al. | 707/513 |
| 2002/0078091 A1* | 6/2002 | Vu et al. | 707/513 |
| 2002/0080196 A1* | 6/2002 | Bornstein et al. | 345/854 |
| 2002/0091671 A1* | 7/2002 | Prokoph | 707/1 |
| 2002/0103836 A1* | 8/2002 | Fein et al. | 707/531 |
| 2002/0128821 A1* | 9/2002 | Ehsani et al. | 704/10 |
| 2002/0138528 A1* | 9/2002 | Gong et al. | 707/530 |
| 2002/0174101 A1* | 11/2002 | Fernley et al. | 707/1 |
| 2003/0020749 A1* | 1/2003 | Abu-Hakima et al. | 345/752 |
| 2003/0028558 A1* | 2/2003 | Kawatani | 707/500 |
| 2003/0079185 A1* | 4/2003 | Katariya et al. | 715/530 |
| 2003/0130837 A1* | 7/2003 | Batchilo et al. | 704/9 |
| 2004/0034835 A1* | 2/2004 | Kuruoglu et al. | 715/530 |
| 2004/0073548 A1* | 4/2004 | Lim et al. | 707/5 |
| 2004/0093328 A1* | 5/2004 | Damle | 707/3 |
| 2004/0111404 A1* | 6/2004 | Mano et al. | 707/3 |
| 2004/0133560 A1* | 7/2004 | Simske | 707/3 |
| 2004/0225667 A1* | 11/2004 | Hu et al. | 707/100 |
| 2005/0091203 A1* | 4/2005 | Liu et al. | 707/3 |
| 2005/0096897 A1* | 5/2005 | Ando et al. | 704/4 |
| 2005/0131931 A1* | 6/2005 | Kawajiri | 707/101 |
| 2005/0154702 A1* | 7/2005 | Liu et al. | 707/1 |
| 2005/0203970 A1* | 9/2005 | McKeown et al. | 707/203 |
| 2006/0031195 A1* | 2/2006 | Patterson | 707/3 |
| 2006/0047651 A1* | 3/2006 | Milic-Frayling et al. | 707/5 |
| 2006/0059442 A1* | 3/2006 | Bornstein et al. | 715/854 |
| 2006/0112134 A1* | 5/2006 | Tsuboi et al. | 707/102 |
| 2006/0167930 A1* | 7/2006 | Witwer et al. | 707/102 |
| 2006/0195338 A1* | 8/2006 | Seibel et al. | 705/1 |
| 2006/0200464 A1* | 9/2006 | Gideoni et al. | 707/6 |
| 2006/0224584 A1* | 10/2006 | Price | 707/6 |
| 2006/0265666 A1* | 11/2006 | Bornstein et al. | 715/802 |
| 2007/0061356 A1* | 3/2007 | Zhang et al. | 707/102 |
| 2007/0073683 A1* | 3/2007 | Kobayashi et al. | 707/6 |
| 2007/0118506 A1* | 5/2007 | Kao et al. | 707/3 |
| 2007/0118518 A1* | 5/2007 | Wu et al. | 707/5 |
| 2008/0082477 A1* | 4/2008 | Dominowska et al. | 707/1 |
| 2008/0104506 A1* | 5/2008 | Farzindar | 715/254 |
| 2008/0109425 A1* | 5/2008 | Yih et al. | 707/5 |
| 2009/0083026 A1* | 3/2009 | Morsy et al. | 704/9 |

FOREIGN PATENT DOCUMENTS

| | | |
|---|---|---|
| WO | WO 02/19172 A1 | 3/2002 |
| WO | WO 2006121338 A2 * | 11/2006 |

OTHER PUBLICATIONS

Summarizing Text Documnets, Sentence Selection and Evaluation Metrics, Goldstein et al, SIGIR' 99.*

Generic Summarization and Keyphrase Extraction Using Mutual Reinforcement Principle and Sentence Clustering, Zha et al, SIGIR' 2002, Aug. 11-15, 2002.*

Abstract generation based on rhetorical structure extraction, Ono et al, Research and development center, Toshiba corporation, Kawasaki, Japan.*

Probabilistic techniques for phrase extraction, Fangfang et al , Information Processing and Management 37, 199-220, 2001.*

Automatic Text Structuring and Summarization, Salton et al., Information Processing and Management, 33(2), pp. 193-207, 1997.*

Phrase-based Document Similarity Based on an Index Graph Model, Hammouda et al, IEEE International Conference on Data Mining (ICDM), pp. 203-210, 2003.*

Graph-based Text Representation and Knowledge Discovery, Jin et al., Proceedings of the 2007 ACM symposium on Applied computing, pp. 807-811, 2007.*

A sentimental Education: Sentiment Analysis Using Subjectivity Summarization Based on Minimum Cuts, Pang et al., Proceedings of the 42nd Annual Meeting on Association for Computational Linguistics, 2004.*

Knight et al., "Statistics-Based Summarization—Step One: Sentence Compression", www.aaai.org, 8 pages, 2000.

Mittal et al., "Selecting Text Spans for Document Summaries: Heuristics and Metrics", www.aaai.org, 7 pages, 1999.

Rabiner, "A Tutorial on Hidden Markov Models and Selected Applications in Speech Recognition", Proceedings of the IEEE, vol. 77, No. 2, pp. 257-286, Feb. 1989.

Kupiec et al., "A Trainable Document Summarizer", 6 pages, SIGIR '95, 1995.

McDonald, "A Study of Global Inference Algorithms in Multi-Document Summarization", pp. 1-12, 2007.

Lin, "ROUGE: A Package for Automatic Evaluation of Summaries", 8 pages, 2004.

Berger et al., "Query-Relevant Summarization using FAQs" 8 pages, 2000.

* cited by examiner

GENERATION OF SEARCH RESULT ABSTRACTS

BACKGROUND

1. Field

The subject matter disclosed herein relates to data processing, and more particularly to information extraction and information retrieval methods and systems.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for relevant information to be identified and presented in an efficient manner.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some exemplary methods and systems are described herein that may be used to provide a score or other like value to phrases from a set of sentences based at least in part on a utility function. As will be described in greater detail below, certain exemplary embodiments described herein may provide a score to phrases from a set of sentences based at least in part on a utility function. For example, certain exemplary procedures described herein may be adapted to generate an abstract of an electronic document based at least in part on at least one utility metric or other like measurement associated with such phrases as well as on a ranked order of sentences. Further, the procedures described herein may also calculate an optimal path through combinations of phrases. An abstract may then be formulated based at least in part on such an optimal path through such combinations of phrases.

As used herein, the term "electronic document" may include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image. Unless specifically stated, an electronic document may refer to either the source code for a particular web page or the web page itself. Each web page may contain embedded references to images, audio, video, other web documents, etc. One common type of reference used to identify and locate resources on the web is a Uniform Resource Locator (URL).

When performing a search, a search result page may return several of the most relevant URLs and/or associated information in a result set. These results may be displayed in ranked order. For electronic documents displayed in the result set, a title, an abstract, and a URL may be included in a search result summary. Such an abstract may be of limited length, such as two or three lines of text, for example. Additionally, abstracts may be provided so that a user may be better able to discern if a given electronic document is relevant to the given search query. Accordingly, an abstract may be designed so as to provide a user with an approximation of the gist of a given electronic document.

As will be discussed in greater detail below, such an abstract may be generated by extracting portions of text from a given electronic document. Such extracted portions of text from a given electronic document may include one or more phrases that may comprise at least a portion of a sentence from the given electronic document.

Figure 1:
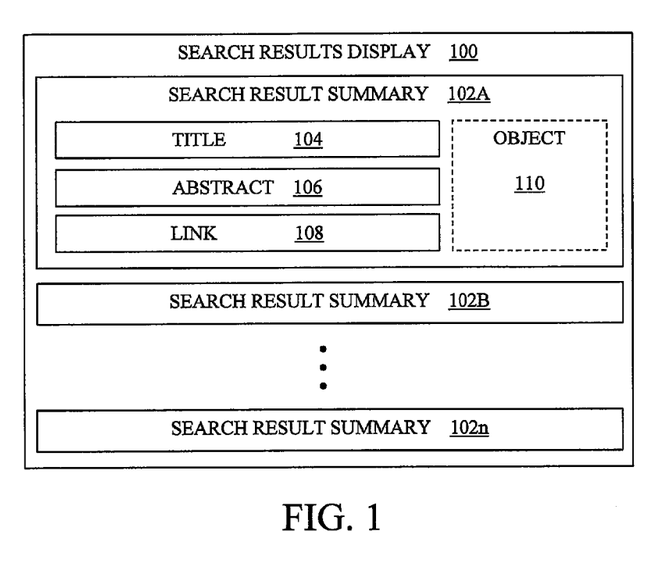
FIG. 1 is an illustrative diagram showing portions of a search result display in accordance with one or more embodiments.

FIG. 1 is an illustrative diagram showing an exemplary search results display 100, for example, as might be shown to a user through a user interface and input/output device. Search results summary display 100 may include a plurality of search result summaries 102 associated with a query. Here, for example, search result summaries 102A and 102B through 102n are shown. Exemplary search result summary 102A may include one or more portions such as, for example, a title 104, an abstract 106, a link 108, and/or an object 110. As used herein the term "abstract" may refer to a subset of text from and/or otherwise associated with a given electronic document.

While some or all of the information in certain search result summaries may be pre-defined or pre-written, for example, by a person associated with the website, the search engine service, and/or a third person or party, there may still be a need to generate some or all of the information in at least a portion of the search result summaries. Thus, when a search result summary needs to be generated, a search engine may be adapted to create a search result summary, for example, by extracting certain information from a web page. With so many websites and web pages being available, it may be beneficial to identify which portions from a given electronic document may be more relevant, may be more important, and/or which may be more informative if incorporated into an abstract 106.

Figure 2:
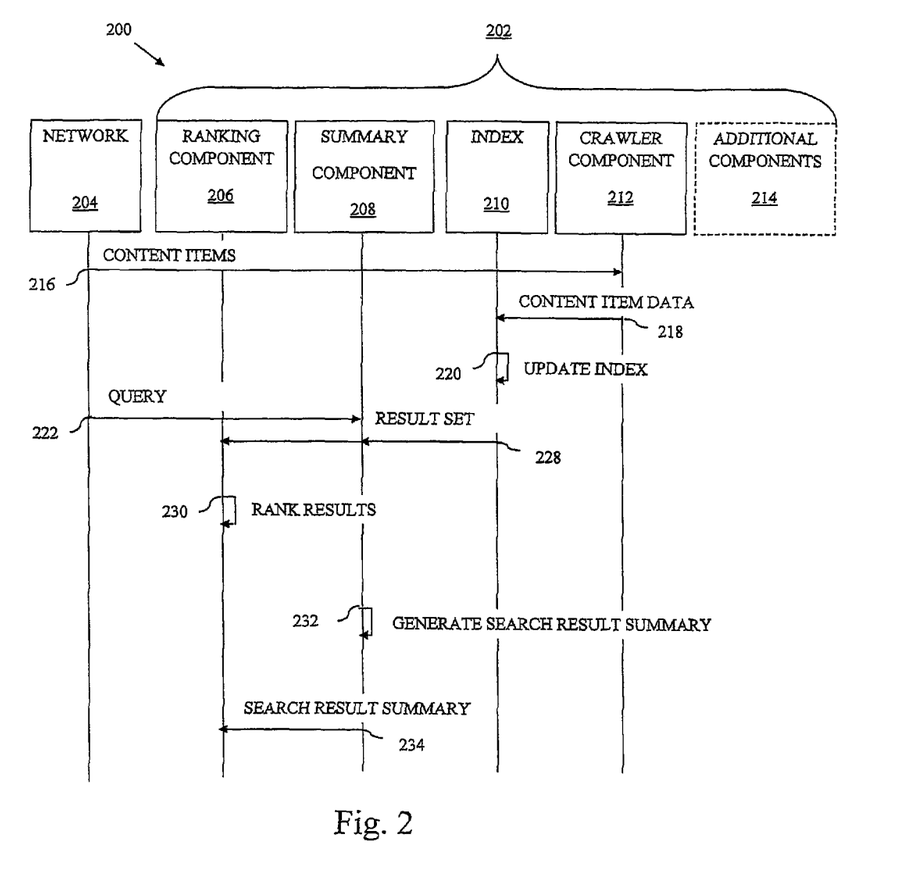
FIG. 2 is a diagram illustrating a procedure for indexing and/or ranking electronic documents in accordance with one or more embodiments.

Procedure 200 illustrated in FIG. 2 may be used to index and/or rank electronic documents in accordance with one or more embodiments, for example, although the scope of claimed subject matter is not limited in this respect. Additionally, although procedure 200, as shown in FIG. 2, comprises one particular order of actions, the order in which the actions are presented does not necessarily limit claimed subject matter to any particular order. Likewise, intervening actions not shown in FIG. 2 and/or additional actions not shown in FIG. 2 may be employed and/or actions shown in FIG. 2 may be eliminated, without departing from the scope of claimed subject matter.

Procedure 200 depicted in FIG. 2 may in alternative embodiments be implemented in software, hardware, and/or firmware, and may comprise discrete operations. As illustrated, procedure 200 governs the operation of a search engine 202. Search engine 202 may be capable of searching for content items of interest. Search engine 202 may communicate with a network 204 to access and/or search available information sources. By way of example, but not limitation, network 204 may include a local area network, a wide area network, the like, and/or combinations thereof, such as, for example, the Internet. Additionally or alternatively, search engine 202 and its constituent components may be deployed across network 204 in a distributed manner, whereby components may be duplicated and/or strategically placed throughout network 204 for increased performance.

Search engine 202 may include multiple components. For example, search engine 202 may include a ranking component 206, a summary component 208, index 210, and/or a crawler component 212, as will be discussed in greater detail below. Additionally or alternatively, search engine 202 also may include various additional components 214. For example, search engine 202 may also include a search component capable of searching the content items retrieved by crawler component 212. Search engine 202, as shown in FIG. 2, is described herein with non-limiting example components. Thus, as mentioned, further additional components 214 may be employed, without departing from the scope of claimed subject matter.

Crawler component 212 may retrieve content items through network 204, as illustrated at action 216. For example, crawler component 212 may retrieve content items and store a copy in a cache (not shown). Additionally, crawler component 212 may follow links between content items so as to navigate across the Internet and gather information on an extensive number of electronic documents. For example, such content items may comprise a set of electronic documents retrieved from network 204.

Data from content items gathered by crawler component 212 may be sent to index 210, as illustrated at action 218. Index 210 may index such content item data, as illustrated at action 220. For example, index 210 may be updated based at least in part on content items comprising a set of electronic documents. Index 210 may parse a given content item into indexable terms, such as concepts and/or entities. Additionally, identifying information of the electronic documents may also be indexed so that a given term may be associated with a corresponding electronic document. Index 210 may index terms and may store information regarding which documents contain a term. Accordingly, search engine 202 may determine which electronic documents contain terms associated with a query, as illustrated at action 222, based at least in part on checking for individual terms within index 210.

Ranking component 206 may receive a search result set from index 210, as illustrated at action 228. For example, search engine 202 may also include a search component (not shown) capable of searching the electronic documents indexed within index 210 so as to generate a result set. Ranking component 206 may be capable of ranking such a result set such that the most relevant electronic documents in the result set may be presented to a user first, according to descending relevance, as illustrated at action 230. For example, the first electronic document in the result set may be the most relevant in response to a query and the last electronic document in the result set may be the least relevant while still falling within the scope of the query. Such a ranked result set may comprise a search result that may be presented to a user via search results display 100.

Summary component 208 may receive a search result set from index 210, as illustrated at action 228. Alternatively, summary component 208 may receive a ranked result set from ranking component 206. Summary component 208 may generate one or more search result summaries for electronic documents associated with a given search result set or ranked result set at action 232. As discussed above, such search result summaries may include an abstract. Such an abstract may be generated by extracting portions of text from a given electronic document. Such extracted portions of text from a given electronic document may include one or more phrases that may comprise at least a portion of a sentence from the given electronic document. At action 234, such search result summaries may be received by the ranking component 206 for transmission to a user and/or display in a search result page.

Figure 3:
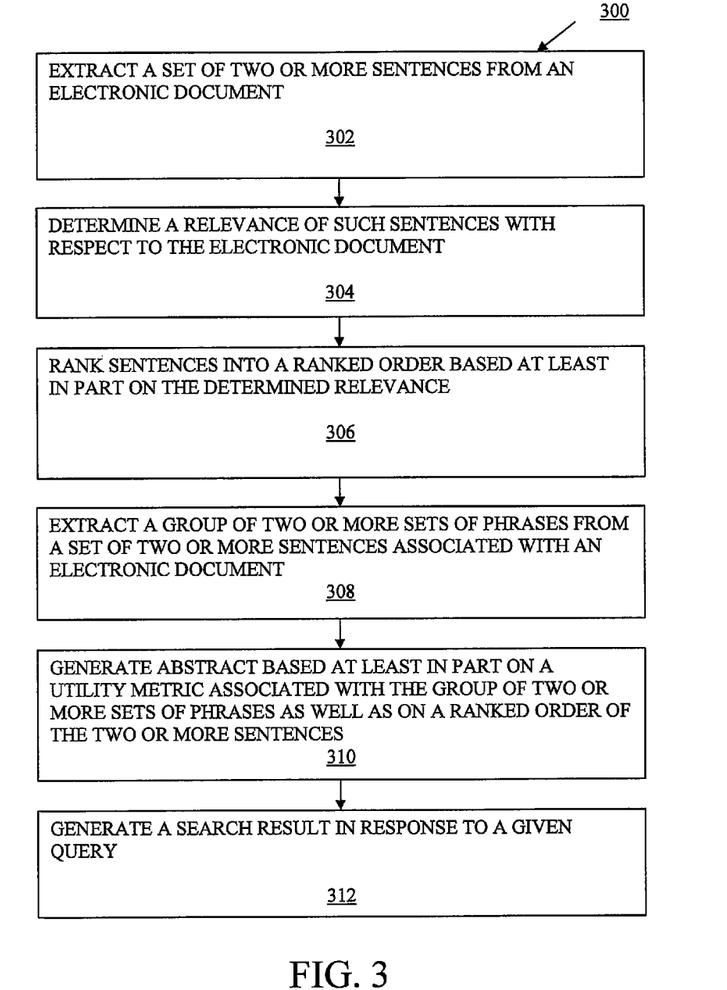
FIG. 3 is a flow diagram illustrating a procedure for generating search result summaries for search results in accordance with one or more embodiments.

Procedure 300, as illustrated in FIG. 3, may be used to generate one or more search result summaries for electronic documents associated with a given search result set in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Procedure 300, depicted in FIG. 3, may in alternative embodiments be implemented in software, hardware, and/or firmware, and may comprise discrete operations. As illustrated, procedure 300 may be used to generate one or more search result summaries for electronic documents associated with a given search result set. Starting at block 302, a set of two or more sentences may be extracted from an electronic document. An electronic document may typically include a plurality of sentences. As used herein the term "sentence" may include a line or string of text that may include any number of characters, including complete grammatical sentences, grammatically incomplete sentences, and/or including a set or string of characters that fills or otherwise forms a single line, a paragraph, a section, a quotation, a label, a title, a heading, and/or the like within a page. Accordingly, an electronic document may be processed into a series of sentences. As will be discussed below, these sentences may then be ranked based at least in part on the relevance of a given sentence with respect to a given query.

At block 304, a relevance of such sentences with respect to the electronic document may be determined. For example, a relevance of such sentences may be determined based at least in part upon an intent of a given query, a query-dependent relevance, and a degree to which the two or more sentences summarize the electronic document. In such an instance, determinations may be made of an intent of a given query, a query-dependent relevance of such sentences with respect to a given query, as well as a degree to which such sentences summarize the given electronic document. Additionally or alternatively, other methods may be utilized to establish a relevance of such sentences. At block 306, such sentences may be ranked into a ranked order based at least in part on such determined relevance. In some situations, there may be less than two or more sentences. In such cases, procedure 300 may proceed to generate one or more search result summaries without a ranked order. For example, one or more phrases from a set of less than two or more sentences may be extracted that fits within a target length, as will be discussed in greater detail below.

At block 308, a group of two or more sets of phrases may be extracted from such a set of two or more sentences associated with an electronic document. A single sentence may be associated with a single set of one or more phrases, while another sentence may be associated with another set of one or more phrases. Accordingly, an extracted sentence may be further processed into a series of one or more phrases that may comprise at least a portion of a given sentence from the given electronic document. For example, sentences may be segmented into phrases based at least in part on consideration such as linguistic break points, punctuation, and/or maintaining textual integrity (e.g. not sundering names, dates, and/or other words/concepts).

Additionally or alternatively, two or more phrases may contain overlapping content. Accordingly, these overlapping phrases may be collapsed into a single representative phrase prior to further processing to select phrases for inclusion in a given abstract. For example, these overlapping phrases may be processed by a utility function, as will be described in greater detail below, to select a single phrase for further processing while the non-selected phrases may not be further considered.

As will be discussed in more detail below, the composition of an abstract may be based at least in part on a given query string q and on a given ranked list of relevant sentences $S=<s^1, s^2, \ldots, s^N>$. For each sentence $s^n$, a set of phrases $P=\{p_1, p_2, \ldots, p_M\}$ may be generated. One purpose for generating phrases $p_m$ may be to use one of them in place of a sentence $s^n$ during the composition of an abstract. Note that P may include a sentence $s^n$ as one of its elements.

At block 310, at least a portion of an abstract of the electronic document may be generated using at least one phrase from the group of two or more sets of phrases. Such an abstract may be generated based at least in part on a utility metric associated with the group of two or more sets of phrases and/or on a ranked order of the two or more sentences.

As discussed above, for each sentence $s^n$ from a ranked list of relevant sentences $S=<s^1, s^2, \ldots, s^N>$ a set of phrases $P=\{p_1, p_2, \ldots, p_M\}$ may be generated. A consideration of every possible combination of phrases may comprise $M^N$ possible calculations. Alternatively, the procedures described herein may reduce a consideration of possible combinations of phrases to $(M^2 \times N)$ possible calculations. Such a simplification of the calculation may be based at least in part on breaking down the calculation sentence-by-sentence, so that each subsequent sentence calculation is dependent on the preceding sentence calculation. For example, as will be discussed in greater detail below, a Viterbi-like algorithm may be utilized to select a sequence of phrases for composing an abstract. Alternatively, other optimization techniques other than a Viterbi-like algorithm may be utilized to select a sequence of phrases for composing an abstract. For example, such optimization techniques that may be utilized to select a sequence of phrases for composing an abstract may include Brute Force method, integer programming, and/or the like.

Accordingly, the extracted phrases may be processed for inclusion or exclusion from the abstract. For example, a first sentence may comprise four phrases comprising at least a portion of a first sentence. In one example, during composition of an abstract, no more than a single phrase may be selected from a given sentence for inclusion in an abstract. In some instances, for example, no phrase may be selected from a given sentence. Additionally or alternatively, redundant phrases may be excluded during the generation of an abstract, based at least in part on redundant combinations of phrases producing relatively low scores based at least in part on a utility function. In general, these phrases may be processed for inclusion or exclusion from the abstract so as to provide a succinct abstract that illustrates what the electronic document may be about and/or why the electronic document may be relevant to a given query. Additionally, these phrases may be processed for inclusion or exclusion from the abstract so as to provide a succinct abstract that may be within the upper bounds of a target length. For example, such a target length may be introduced into such a utility function as a hard length constraint on the overall length of an abstract in addition to a measures of length $L(p_m)$ that may quantify how long individual phrases $p''_{m*}$ composing an abstract are, as is discussed in greater detail below.

A utility metric, as mentioned above, may include at least one type of metric associated with at least one distinguishable measurement. Such a distinguishable measurement may, for example, identify or otherwise relate to a measure of readability of a given phrase, a measure of relevance of a given phrase with respect to a given query, a measure of relevance of a given phrase with respect to the electronic document, a measure of length of a given phrase, combinations thereof, and/or the like. For example, a given phrase $p''_{m*}$ from a set of phrases P may be associated with a set of distinguishable measurements. Such a set of distinguishable measurements may include measures of readability $R(p_m)$, query-relevant information $I(p_m)$, aboutness of the document $A(p_m)$, length $L(p_m)$, combinations thereof, and/or the like. A measures of readability $R(p_m)$ may quantify the readability of a given phrase $p''_m*$. Similarly, a measures of query-relevant information I($p_m$) may quantify how closely a given phrase $p''_{m*}$ matches with a given query. Likewise, a measures of aboutness of the document A($p_m$) may quantify how closely a given phrase $p''_{m*}$ represents all or a portion of the subject matter of a given document. Lastly, a measures of length L($p_m$) may quantify how long a given phrase $p''_{m*}$ is. Additionally or alternatively, the particular distinguishable measurements mentioned above may be excluded and/or replaced with alternative quality attributes. For example, automated and/or semi-automated techniques may utilize and/or train one or more evaluation models to evaluate a given phrase for readability R($p_m$), query-relevant information I($p_m$), aboutness of the document A($p_m$), and/or the like. Such evaluation models may generate an objective model judgment value that may predict or otherwise may resemble a user judgment value (e.g., a quantitative quality score) for a given phrase. Such model judgment values may be useful in ranking readability of given phrases, ranking relevancy of given phrases, ranking aboutness of given phrases, and/or the like.

The procedures described herein may provide a score to various phrases and/or combinations of phrases from a set of sentences based at least in part on a utility function associated with one or more utility metrics. Further, the procedures described herein may also calculate an optimal path through such combinations of phrases. An abstract may then be formulated based at least in part on such an optimal path through such combinations of phrases. In one example, given a ranked list of sentences S and the corresponding hypothesized phrase sets P=<$P^1$, $P^2$, ..., $P^N$>, no more than one phrase $p''_m*$ may be selected from each phrase set $P^n$ corresponding to the sentence $s^n$ such that a utility function:

$$U(S, P; \alpha, \beta, \gamma, \delta) = \sum_{n=1}^{N} u(p^n_{m*}; p^{n-1}_{m*}, \ldots, p^1_{m*}) = \quad (1)$$

$$\sum_{n=1}^{N} \alpha R(p^n_{m*}; p^{n-1}_{m*}, \ldots, p^1_{m*})) +$$

$$\beta I(p^n_{m*}; p^{n-1}_{m*}, \ldots, p^1_{m*})) + \gamma A(p^n_{m*}; p^{n-1}_{m*}, \ldots, p^1_{m*})) +$$

$$\delta L(p^n_{m*}; p^{n-1}_{m*}, \ldots, p^1_{m*}))$$

may be maximized. Here u($p''_{m*}$) is the utility value associated with a specific phrase, and the parameters $\alpha$, $\beta$, $\gamma$, and $\delta$ are the weights associated with the readability, information and length of the phrases. In another example, more than one phrase per sentence may be selected such that the total utility is maximized.

The exemplary utility function described above may rely on weights, such as illustrated by weights $\alpha$, $\beta$, $\gamma$, and $\delta$. These weights may be set manually. Alternatively, such weights may be established by minimizing a distance function between algorithm generated abstracts and other (possibly) human generated abstracts. For example, such methods capable of minimizing a distance function may include a linear function, Nelder-Mead method, simulated annealing, and/or the like. Likewise, such weights may be established by training against some editorial data that may indicate how good a given abstract may be for a given weight value. Such weights may, for example, be established by training against some user click metric gathered from the web.

In one example, the generation of an abstract may be performed based at least in part on information from a given query. As discussed above, sentence ranking and/or phrase selection may be based at least in part on information from a given query. Such formulation of abstracts may be performed dynamically so as to be responsive to a given query. For example, abstracts may be formulated at the time of the given query and may incorporate phrases that correspond closely with terms used in the given query. Such a dynamic formulation of abstracts may provide a user with an approximation of the gist of a given electronic document as well as provide a user with an approximation of how the electronic document is relevant to the given query.

Alternatively, abstracts may be pre-formulated. Such pre-formulated abstracts may be generated independent from a given query, such as without directly factoring in a given query. In such a case, sentence ranking and/or phrase selection may be determined without reference to information from a given query. In such a case, abstracts may be predetermined prior to a given search request. For example, abstracts may be formulated prior to the submission time of a given query and may incorporate phrases that correspond closely with the overall relevance of a given electronic document. Such pre-formulated abstracts may provide a user with an approximation of the gist of a given electronic document without burdening a search engine with abstract related calculations during a search in real time. Such predetermined abstracts may be less precise as a reflection of the relevance to a given query; however, increased computing power may be applied offline to improve the overall quality of such query-independent predetermined abstracts. Additionally, such predetermined abstracts may reduce processing load during a search and/or accelerate the return of a search result. Such predetermined abstracts may be stored in the metadata of a given electronic document and/or stored in an index (See FIG. 2) of a search engine.

Figure 4:
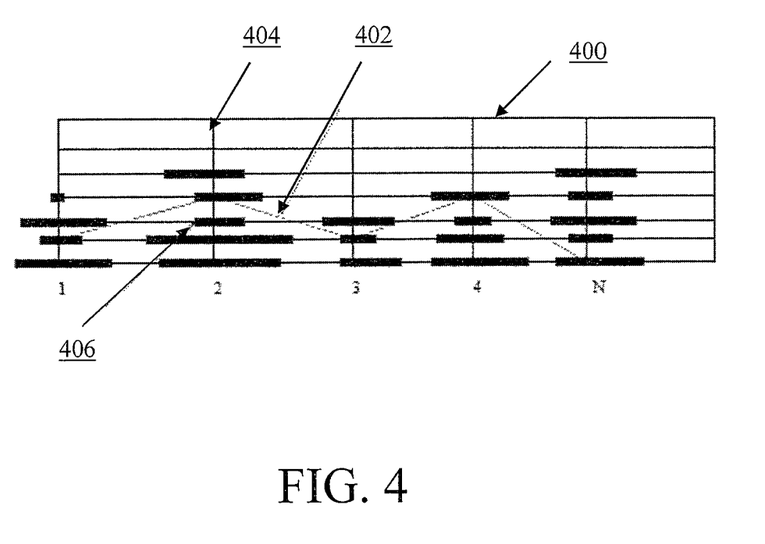
FIG. 4 is a chart illustrating a procedure for generating search result summaries for search results in accordance with one or more embodiments.

Referring to FIG. 4, during a composition of abstracts from phrases, for each sentence $s^n$ (shown here as distributed along a horizontal axis) there may be a set of candidate phrases $p''_m$ (shown here as stacked along a vertical axis) that may be used in its place. For example, the candidate phrases 406 for second sentence (2) are shown as the stack of horizontal lines of different lengths. In one example, the task may be to select no more than one candidate phrase for each sentence such that the total utility is maximized (marked by the optimal path 402 in the figure.) In another example, more than one phrase per sentence may be selected such that the total utility is maximized.

The composition problem can be viewed as the problem of finding an optimal path in a trellis 400. The algorithm itself may be a dynamic programming algorithm where at each step n along horizontal axis representing individual sentences 404, one stores the maximum utility path that uses a specific phrase 406 ($p''_m$,) and the utility value itself. Once the trellis values are computed for the final sentence N, the phrase associated with the maximum utility may be selected and the path 402 that gives the maximum utility may be found by backtracking.

The generation of an abstract may comprise processing the utility metric based at least in part on a Viterbi-like algorithm to select a sequence of phrases. Alternatively, other optimization techniques other than a Viterbi-like algorithm may be utilized to select a sequence of phrases for composing an abstract. One such algorithm for finding the optimal sequence of phrases that maximizes utility is illustrated as follows:

Initialize U(1,m) = u($p_m^1$), for m = 1,$M^1$.
For n = 2, ..., N
   For m = 1, ..$M^n$
      U(n,m) = $\max_{j=1}^{M^{n-1}}$(U(n – 1,j) + u($p_m^n$;U(n – 1,j))). (best utility value)
      V(n,m) = arg $\max_{j=1}^{M^{n-1}}$(U(n – 1,j) + u($p_m^n$;U(n – 1,j))).
   End For
End For
Maximum utility value: U = $\max_{m=1}^{M^N}$U(N,m).
Optimal path is stored in the array W:
W(N) = arg $\max_{m=1}^{M^N}$U(n,m).

```
For n = N - 1, ..., 1
    W(n) = V(n + 1,W(n + 1)) (backtrack)
End For
```

The exemplary algorithm above presents a Viterbi-like algorithm for selecting a sequence of phrases 406 for composing an abstract. The algorithm above is based at least in part on i) a given ranked sequence of sentences, ii) a given set of the candidate phrases associated with each sentence and the utility metric associated with each phrase, and iii) a given model for combining the utilities of a sequence of phrases.

In the operation of a Viterbi-like algorithm, at a first sentence one or more phrases may be scored according to a utility function. At a second sentence, one or more phrases may be scored in combination with the one or more phrases associated with the first sentence. This calculation may proceed to subsequent sentences to reach a last sentence N. Additionally, such a calculation may include scoring phrases associated with a current stage (n) in combination with the phrases associated with the immediately preceding stage (n−1). Alternatively, such a calculation may include scoring phrases associated with a current stage (n) in combination with the phrases associated with the immediately preceding stage (n−1) and/or in combination with the phrases associated with other preceding stage (n−k). Various calculated combinations between a first sentence and subsequent sentences, up to and including a last sentence N, may comprise a running summary value associated with the various calculated combinations. After reaching sentence N, a backtracking procedure may proceed from a last sentence N to a preceding sentence (illustrated here as a fourth sentence) to find the optimal path between a last sentence N and a first sentence.

Referring back to FIG. 3, at block 312, a search result may be generated in response to a given query. Such a search result may, for example, include at least one search result summary (e.g., see FIG. 1). Such a search result summary may include at least one type of information portion such as, for example, a title, an abstract, a link, an object, combinations thereof, and/or the like. Such search result may be transmitted to a user and/or displayed in a search result page.

Figure 5:
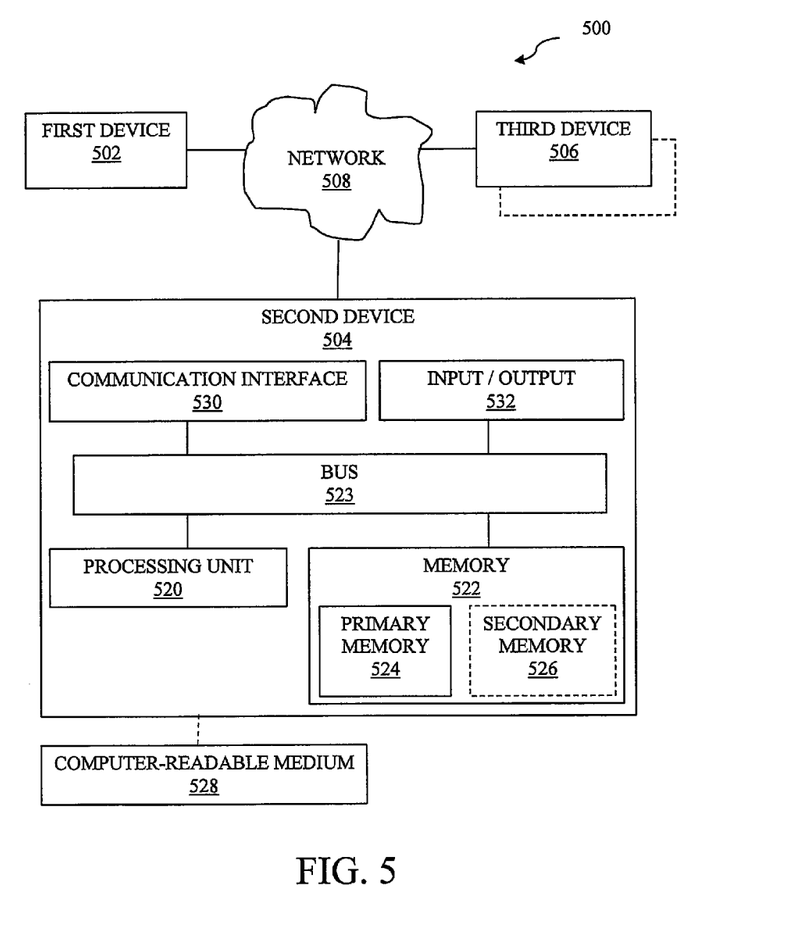
FIG. 5 is a block diagram illustrating an exemplary embodiment of a computing environment system in accordance with one or more embodiments.

FIG. 5 is a block diagram illustrating an exemplary embodiment of a computing environment system 500 that may include one or more devices configurable to generate an abstract of an electronic document based at least in part on a utility metric associated with a group phrases as well as on a ranked order of sentences using one or more techniques illustrated above, for example. For example, computing environment system 500 may be configurable to tangibly embody all or a portion of procedure 200 of FIG. 2 and/or procedure 300 of FIG. 3.

Computing environment system 500 may include, for example, a first device 502, a second device 504 and a third device 506, which may be operatively coupled together through a network 508.

First device 502, second device 504 and third device 506, as shown in FIG. 5, are each representative of any device, appliance or machine that may be configurable to exchange data over network 508. By way of example but not limitation, any of first device 502, second device 504, or third device 506 may include: one or more computing platforms or devices, such as, e.g., a desktop computer, a laptop computer, a workstation, a server device, storage units, or the like.

Network 508, as shown in FIG. 5, is representative of one or more communication links, processes, and/or resources configurable to support the exchange of data between at least two of first device 502, second device 504 and third device 506. By way of example but not limitation, network 508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 506, there may be additional like devices operatively coupled to network 508.

It is recognized that all or part of the various devices and networks shown in system 500, and the processes and methods as further described herein, may be implemented using or otherwise include hardware, firmware, software, or any combination thereof.

Thus, by way of example but not limitation, second device 504 may include at least one processing unit 520 that is operatively coupled to a memory 522 through a bus 523.

Processing unit 520 is representative of one or more circuits configurable to perform at least a portion of a data computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 528. Computer-readable medium 528 may include, for example, any medium that can carry and/or make accessible data, code and/or instructions for one or more of the devices in system 500.

Second device 504 may include, for example, a communication interface 530 that provides for or otherwise supports the operative coupling of second device 504 to at least network 508. By way of example but not limitation, communication interface 530 may include a network interface device or card, a modem, a router, a switch, a transceiver, and the like.

Second device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 532 may include an operatively adapted display, speaker, keyboard, mouse, trackball, touch screen, data port, etc.

Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In one implementation, one or more abstracts may be generated via a computing platform. Such abstract generation may be performed via a computing platform that manipulates or transforms electronic signals employed to represent physical electronic or magnetic quantities, or other physical quantities, within the computing platform's memories, registers, or other information storage, transmission, or display devices. For example, a computing platform may be adapted to extract a group of two or more sets of phrases, represented within such a computing platform by digital electronic signals, from a set of two or more sentences associated with an electronic document. Such a computing platform may additionally be adapted to generate an abstract, represented within such a computing platform by digital electronic signals, of such an electronic document using at least one phrase from the group of two or more sets of phrases. For example, such an abstract may be generated based at least in part on a utility metric associated with such a group of two or more sets of phrases as well as on a ranked order of two or more sentences. Such a computing platform may transmit a search result, represented within by digital electronic signals, to a user based at least in part on such a generated abstract. It will be understood that such operations may be performed only on a single computing platform and/or on more than one computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
   extracting, by a computing platform comprising one or more processors, a group of two or more sentences of an electronic document;
   segmenting individual sentences of said of said two or more sentences into a first phrase and at least a second phrase, said first phrase comprising at least one word not contained within said at least a second phrase;
   determining two or more paths between phrases of said individual sentences, individual paths of said two or more paths comprising no more than one phrase from individual ones of said individual sentences;
   at least partially in response to receiving a search query, determining respective scores for said individual paths based at least in part on a utility metric and a ranking of said two or more sentences with respect to said search query;
   generating an abstract of said electronic document, said abstract comprising individual ones of said phrases associated with a first path of said two or more paths, said first path being associated with a highest of said respective scores, wherein a first phrase of said phrases associated with said first path is different from a second phrase of said phrases associated with said first path; and
   transmitting one or more search results comprising at least said abstract to a user at least partially in response to receiving said search query from said user.

2. The method of claim 1, further comprising excluding redundant phrases during said generation of an abstract.

3. The method of claim 1, wherein generating said abstract is performed independent from a given query.

4. The method of claim 1, wherein said abstract comprises a subset of text from said electronic document.

5. The method of claim 1, wherein said utility metric comprises at least one of a measure of readability of a given phrase, a measure of relevance of a given phrase with respect to a given query, a measure of relevance of a given phrase with respect to said electronic document, or a measure of length of a given phrase.

6. The method of claim 1, wherein generating said abstract further comprises processing said utility metric based at least in part on a Viterbi-like algorithm to select a sequence of phrases.

7. The method of claim 1, further comprising:
   extracting said set of two or more sentences from said electronic document;
   determining a relevance of said two or more sentences associated with respect to said electronic document; and
   ranking said two or more sentences into said ranked order based at least in part on said determined relevance.

8. The method of claim 1, further comprising:
   extracting said set of two or more sentences from said electronic document;

determining an intent of a given query;
determining a query-dependent relevance of said two or more sentences with respect to a given query;
determining a degree to which said two or more sentences summarize said electronic document;
determining a relevance of said two or more sentences based at least in part upon said intent of a given query, said query-dependent relevance, or said degree to which said two or more sentences summarize said electronic; and
ranking said two or more sentences into said ranked order based at least in part on said determined relevance.

9. The method of claim 1, further comprising:
generating said search result in response to a given query, wherein said search result comprises at least one search result summary, and wherein said search result summary comprises at least one type of information portion comprising a title, an abstract, a link, or an object.

10. The method of claim 1, wherein each of said individual paths comprises phrases to be obtained from at least three of said individual sentences.

11. An article comprising:
a non-transitory storage medium comprising machine-readable instructions which are executable by at least one processor to:
extract a group of two or more sentences of an electronic document;
segment individual sentences of said two or more sentences into a first phrase and at least a second phrase, said first phrase to comprise at least one word not contained within said at least a second phrase;
determine two or more paths between phrases of said individual sentences, individual paths of said two or more paths comprising no more than one phrase from individual ones of said individual sentences;
at least partially in response to a search query to be received, determine respective scores for said individual paths based at least in part on a utility metric and a ranking of said two or more sentences with respect to said search query;
generate an abstract of said electronic document, said abstract comprising individual ones of said phrases associated with a first path of said two or more paths, said first path being associated with a highest of said respective scores, wherein a first phrase of said phrases associated with said first path is different from a second phrase of said phrases associated with said first path; and
transmit one or more search results comprising at least said abstract to a user at least partially in response to receiving said search query from said user.

12. The article of claim 11, wherein said machine-readable instructions which are further executable by said at least one processor to exclude redundant phrases during said generation of said abstract.

13. The article of claim 11, wherein said generation of an abstract is to be performed independent from a given query.

14. The article of claim 11, wherein said generation of an abstract further comprises selection to be performed of no more than a single phrase per sentence based at least in part on said utility function.

15. The article of claim 11, wherein said utility metric comprises at least one of a measure of readability of a given phrase, a measure of relevance of a given phrase with respect to a given query, a measure of relevance of a given phrase with respect to said electronic document, or a measure of length of a given phrase.

16. The article of claim 11, wherein said machine-readable instructions which are further executable by said one or more processors to direct a computing platform to:
extract said set of two or more sentences from said electronic document;
determine an intent of a given query;
determine a query-dependent relevance of said two or more sentences with respect to a given query;
determine a degree to which said two or more sentences summarize said electronic document;
determine a relevance of said two or more sentences based at least in part upon said intent of a given query, said query-dependent relevance, or said degree to which said two or more sentences summarize said electronic document;
rank said two or more sentences into said ranked order based at least in part on said determined relevance;
process said utility metric based at least in part on a Viterbi-like algorithm to select a sequence of phrases during said generation of an abstract;
wherein said abstract comprises a subset of text from said electronic document; and
generate said search result in response to a given query, wherein said search result comprises at least one search result summary, and wherein said search result summary comprises at least one type of information portion selected from a group of distinguishable information portions comprising a title, an abstract, a link, and an object.

17. An apparatus comprising:
a computing platform comprising at least one processor to:
extract a group of two or more sentences of an electronic document;
segment individual sentences of said of said two or more sentences into a first phrase and at least a second phrase, said first phrase comprising at least one word not contained within said at least a second phrase;
determine two or more paths between phrases of said individual sentences, individual paths of said two or more paths to comprise no more than one phrase from individual ones of said individual sentences;
at least partially in response to a search query to be received, determine respective scores for said individual paths based at least in part on a utility metric and a ranking of said two or more sentences with respect to said search query;
generate an abstract of said electronic document, said abstract comprising individual ones of said phrases associated with a first path of said two or more paths, said first path being associated with a highest of said respective scores, wherein a first phrase of said phrases associated with said first path is different from a second phrase of said phrases associated with said first path; and
transmit one or more search results comprising at least said abstract to a user at least partially in response to receiving said search query from said user.

18. The apparatus of claim 17, wherein said generation of an abstract is to be performed independent from a given query.

19. The apparatus of claim 17, wherein said utility metric comprises at least one of a measure of readability of a given phrase, a measure of relevance of a given phrase with respect to a given query, a measure of relevance of a given phrase with respect to said electronic document, or a measure of length of a given phrase.

* * * * *

UNITED STATES PATENT AND TRADEMARK OFFICE
CERTIFICATE OF CORRECTION

PATENT NO.         : 8,984,398 B2                                           Page 1 of 1
APPLICATION NO.    : 12/200380
DATED              : March 17, 2015
INVENTOR(S)        : Tanpas Kanungo, Jan Pedersen and Tamas Sarlos

It is certified that error appears in the above-identified patent and that said Letters Patent is hereby corrected as shown below:

In the claims:

Column 12, line 19 should read:

"segmenting individual sentences of said two or"

Signed and Sealed this
Ninth Day of February, 2016

Michelle K. Lee
*Director of the United States Patent and Trademark Office*